United States Patent [19]

Mack

[11] Patent Number: 5,449,155
[45] Date of Patent: Sep. 12, 1995

[54] SUSPENSION SKOCK ABSORBER FOR BICYCLES

[75] Inventor: Christoph Mack, West Redding, Conn.

[73] Assignee: Cannondale Corporation, Georgetown, Conn.

[21] Appl. No.: 191,298

[22] Filed: Feb. 3, 1994

Related U.S. Application Data

[63] Continuation-in-part of Ser. No. 103,979, Aug. 9, 1993, abandoned.

[51] Int. Cl.$^6$ .............................................. F16F 1/36
[52] U.S. Cl. .................... 267/292; 267/153; 188/322.22; 188/322.19
[58] Field of Search ............... 188/279, 284, 285, 299, 188/300, 312, 316, 317, 319, 321.11, 322.15, 322.22, 322.19; 280/276; 267/35, 292, 152, 153

[56] References Cited

U.S. PATENT DOCUMENTS

| | | | |
|---|---|---|---|
| 1,273,011 | 7/1918 | Snyder | 188/319 |
| 2,561,156 | 7/1951 | Thorkildsen . | |
| 2,771,968 | 11/1956 | Mercier | 188/312 |
| 3,369,802 | 2/1968 | Wallace et al. . | |
| 3,376,031 | 4/1968 | Lee . | |
| 3,420,341 | 1/1969 | Keehn | 188/319 |
| 4,191,280 | 3/1980 | Copperwheat | 188/312 X |
| 4,591,030 | 5/1986 | Antkowiak . | |
| 4,815,763 | 3/1989 | Hartmann . | |
| 5,031,732 | 7/1991 | Batek et al. | 188/322.19 |
| 5,104,101 | 4/1992 | Anderson et al. | 188/322.22 |
| 5,271,485 | 12/1993 | Yowell et al. | 188/312 |

FOREIGN PATENT DOCUMENTS

| | | |
|---|---|---|
| 0420610 | 4/1991 | European Pat. Off. . |
| 362619 | 7/1906 | France . |
| 264003 | 9/1926 | United Kingdom . |
| 469697 | 3/1937 | United Kingdom . |
| 529305 | 4/1939 | United Kingdom . |
| 585122 | 7/1945 | United Kingdom . |

Primary Examiner—Robert J. Oberleitner
Assistant Examiner—Lee W. Young
Attorney, Agent, or Firm—Brumbaugh, Graves, Donohue & Raymond

[57] ABSTRACT

A shock absorber for a bicycle front fork comprises telescopically related inner and outer tubes and an elastomeric spring received within the inner tube and engaged between a lower cap on the inner tube and a preload piston. A through-tube extends concentrically downwardly from an upper cap on the outer tube and is axially coupled to and rotational relative to the outer tube. The preload piston is on the lower end of a rod that is received in the through-tube and is axially adjustable relative to the through-tube to vary the preload of the elastomeric spring. A hydraulic damper composed of a cylinder member received within a lower portion of the inner tube and affixed to the inner tube and a hollow piston telescopically received by the through-tube and affixed to the upper cap includes a controllable bypass for changing the flow of hydraulic liquid between portions of the cylinder chamber on opposite sides of the piston. The bypass flow is controlled by a control member that abuts the piston and is affixed to the through-tube. Both the preload of the elastomeric spring and the damping rate of the hydraulic damper are adjustable by elements that are accessible from outside the shock absorber tubes. The bypass flow can be changed "on the fly."

12 Claims, 4 Drawing Sheets

SUSPENSION SKOCK ABSORBER FOR BICYCLES

The present application is a continuation-in-part of U.S. patent application Ser. No. 08/103,979, filed Aug. 9, 1993, and entitled "SUSPENSION SHOCK FOR A VEHICLE", now abandoned.

BACKGROUND OF THE INVENTION

The present invention relates to suspension systems and more particularly to a suspension shock absorber for bicycles.

Suspension shock absorbers proposed for bicycles have been based on helical coil springs, pneumatic springs, and elastomeric springs. Elastomeric springs have the advantages of relatively low cost, low temperature sensitivity, durability, and a lack of a potential for leakage of a gas or liquid. Previously known elastomeric shock absorbers have several drawbacks as well. Since the compression of the elastomeric material provides the shock absorption, shock absorbers based on an elastomeric element generally permit only a relatively short operating stroke. Previously known designs also have limited capability for variable damping.

There is, therefore, a need for a front suspension shock absorber for a bicycle which is reliable and durable, lightweight and economical, has a relatively long operating stroke, and includes both spring support and damping. Preferably, the shock absorber should permit the user to adjust the spring preload without altering the stroke and adjust the damping rate "on the fly" between two or more values, one of which may be complete "locking out" of the shock absorber.

SUMMARY OF THE INVENTION

There is provided, in accordance with the present invention, a shock absorber comprising an elongated outer tube, an elongated inner tube having a portion adjacent its upper end telescopically and coaxially received within a portion adjacent the lower end of the outer tube for sliding movement axially of the outer tube in guided relation, and a shock-absorbing mechanism received within and coupled between the inner and outer tubes. The shock-absorbing mechanism includes a through-tube connected to the outer tube, received coaxially within an upper portion of the outer tube and having its lower end extending into an upper portion of the inner tube, a preload piston adjacent the lower end of the through-tube and joined to the through-tube, and an elongated elastomeric shock-absorbing member received in the inner tube and engaged under compression between the inner tube and the preload piston. A hydraulic damper mechanism is coupled between the inner and outer tubes and includes a cylinder member connected to one of the tubes and defining with the through-tube an annular chamber containing a hydraulic liquid, a piston connected to the other tube, and a restricted bypass across the piston for permitting the liquid to flow between portions of the chamber on opposite sides of the piston.

In a preferred embodiment, the hydraulic damper is provided with a control that is accessible to a rider while riding the bike for changing the damping rate between at least two different values, one of which may be complete damping that locks out the spring by stopping the flow through the bypass entirely. In particular, the cylinder member is connected to the inner tube, the piston includes an annular piston body received within the cylinder member and a tubular piston rod that extends upwardly out of the cylinder member, is joined to the outer tube and telescopically receives a portion of the through-tube. The outer diameter of the piston rod and the outer diameter of the portion of the through-tube below the piston body and within the cylinder member are equal so that movement of the piston along the cylinder member does not change the volume of the chamber. The through-tube is rotatable relative to the piston rod, and the bypass control includes a flow control member affixed to the through-tube adjacent the piston body. The bypass includes passages through the control member and piston body sized and configured to provide at least two different rates of liquid flow through the bypass in different rotational positions of the control member. One of the two flow rates may be zero, which completely locks out the shock absorber.

The preload piston is movable axially relative to the through-shaft, and a preload adjustment device accessible from outside the tubes permits the user to adjust the axial position of the preload piston relative to the through-tube. In a preferred arrangement, the preload piston is affixed to a preload shaft that is received telescopically within the through-shaft, and an adjustment screw is threaded into a threaded portion at the upper end of the through-shaft.

For a better understanding of the invention, reference may be made to the following description of an exemplary embodiment, taken in conjunction with the accompanying drawings.

DESCRIPTION OF THE EMBODIMENT

Figure 1:
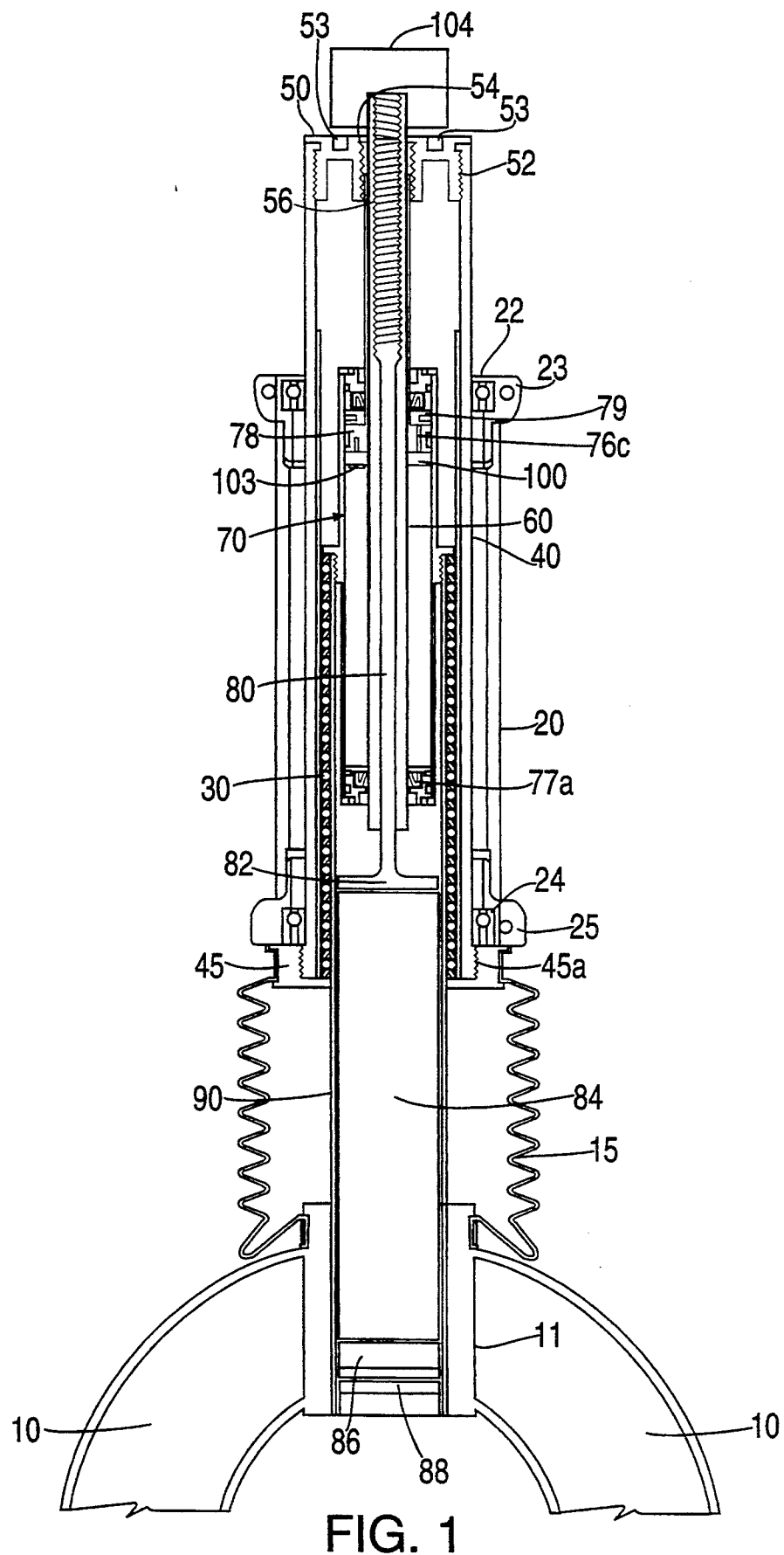
FIG. 1 is a diagrammatic axial cross-sectional view of an embodiment of an elastomeric shock absorber according to the present invention.
Figure 2:
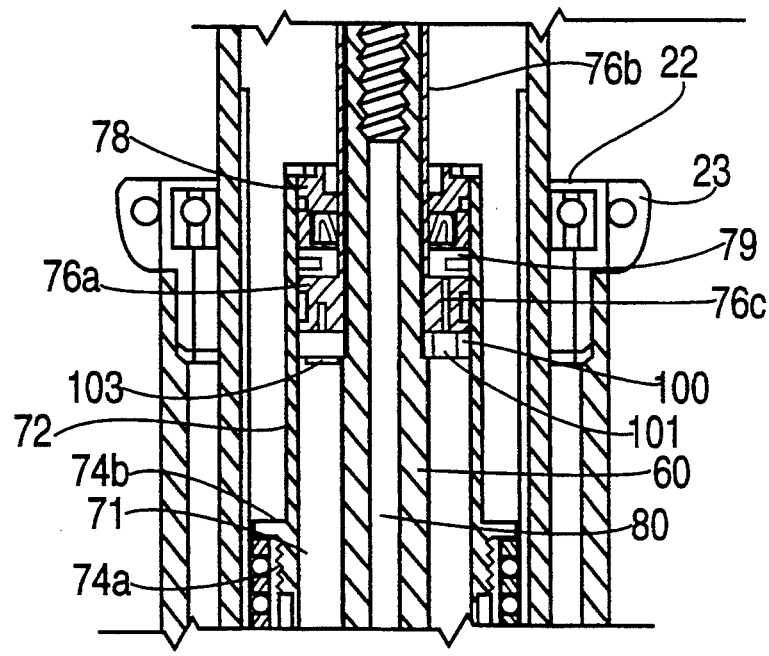
FIG. 2 is a partial axial cross-sectional view of the embodiment of FIG. 1 with a portion broken away and on a larger scale than FIG. 1.
Figure 2:
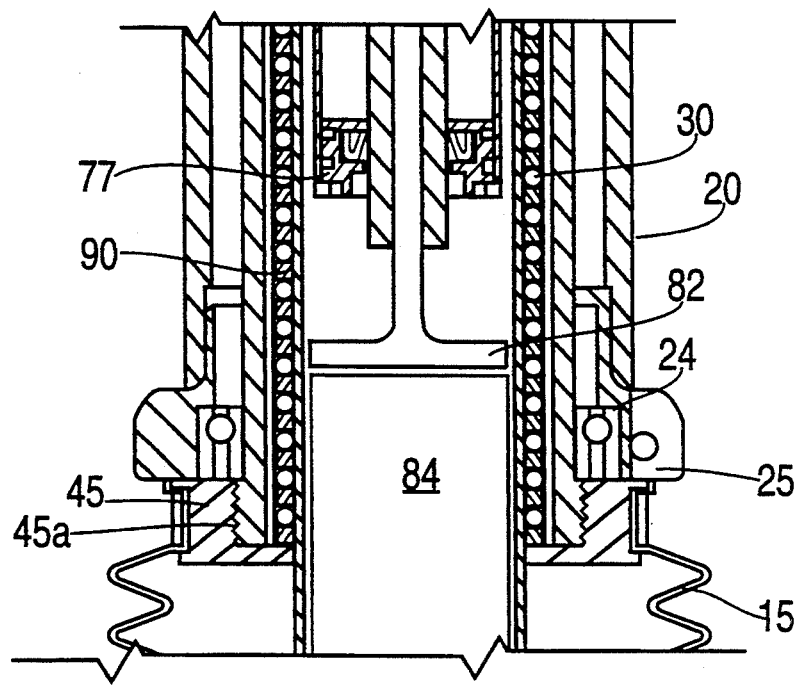

Referring to FIG. 1, the bicycle front wheel (not shown) is mounted on the lower ends of front fork blades 10 that extend outwardly and then downwardly from either side of a fork crown 11. The front fork is telescopically supported by the head tube 20 of the bicycle frame. An outer cylinder or tube 40 is rotatably mounted within the head tube 20 on upper and lower headset roller bearings 22, 24 that are housed within shoulders in respective upper and lower head tube collars 23, 25. An inner cylinder or tube 90 is coaxially and telescopically mounted within the outer tube 40 with needle bearings 30 interposed between the inner tube 90 and the outer tube 40 to provide a low-friction telescoping mechanism. A preferred arrangement of the needle bearing mechanism is described and shown in U.S. patent application Ser. No. 09/037,494 (filed Mar. 26, 1993, and entitled "SUSPENSION ASSEMBLY FOR A VEHICLE"), which is incorporated herein by reference.

A lower collar 45 is attached to the outer tube 40 by a threaded connection 45a, and an extensible bellows boot 15 is secured between the lower collar 45 and the fork crown 11. The boot 15 readily extends and contracts lengthwise with the motion of the suspension and keeps debris and dust from entering the internal mechanisms of the shock absorber.

The lower end of the inner tube 90 is received by and affixed to the fork crown 11 and extends upwardly and telescopically into the lower portion of the outer tube 40. The needle bearing mechanism 30 permits the outer tube 40 to easily slide upwardly and downwardly relative to the inner tube. Spring support of the relative motion of the inner and outer tubes is provided by an elongated elastomeric spring element 84 that is received within the lower portion of the inner tube 90. The elastomeric spring element 84 is compressed between a preload piston 82 and a bottom cap 86, which closes the bottom end of the inner tube 90. The bottom cap 86 is held in place in the lower end of the inner tube 90 by a "Circlip" 88 which is received in an internal annular groove. The tubes 40 and 90 are preferably circular in cross-section but may be square or some other suitable shape.

The preload piston 82 is integral with the lower end of a preload shaft 80 that extends upwardly telescopically through a through-tube 60 that is positioned concentrically within the tubes 40 and 90 and extends upwardly to the top of the shock absorber and through a central threaded hole 54 in a top cap 50. The top cap 50 is affixed to the outer tube 40 by a threaded connection 52 and has a pair of holes 53 which allow insertion of an appropriate tool to assist in tightening or removing the cap 50. The manner of attachment of the through-tube 60 to the cap 50 is described below; suffice it to say at this point that the through-tube is attached to the cap axially and is rotatable relative to the cap.

Figure 3:
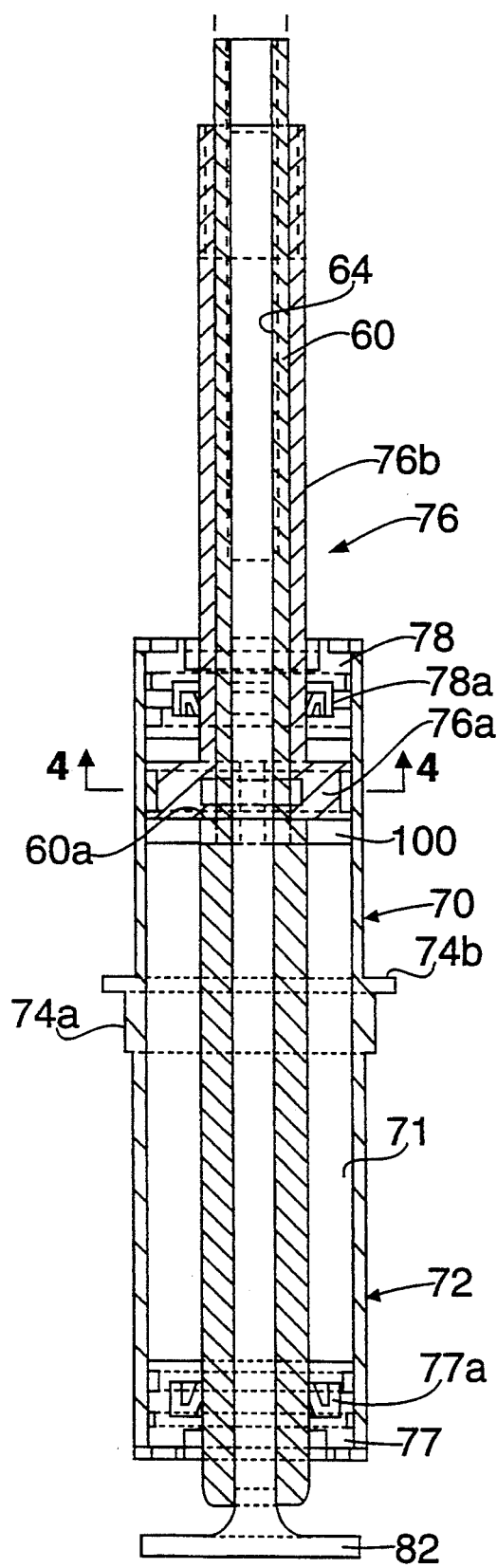
FIG. 3 is an axial cross-sectional view of the hydraulic damping subassembly of the embodiment of FIGS. 1 and 2.
Figure 4:
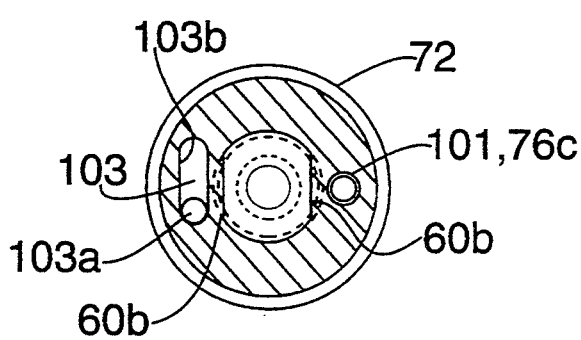
FIG. 4 is an end cross-sectional view of the hydraulic damper subassembly, taken along the line 4—4 of FIG. 3.

As best shown in FIG. 3, the through-tube 60 includes threads 64 along the upper portion of its internal wall. An adjustment screw 56 threads into the internal threads 64 of the through-tube. The preload shaft 80 is axially movable in a sliding relationship relative to the through-tube 60. Its axial position is established by the adjustment screw 56 by means of the threaded connection with the through-tube, a suitable tool such as an Allen head wrench being used to turn the adjustment screw 56 and adjust its position axially relative to the through-tube. By threading the screw downwardly, the preload shaft is moved downwardly correspondingly, and the elastomeric spring element 84 is compressed to increase its compression preload. By threading the screw upwardly, the compression in the elastomeric spring element 84 is reduced. The adjustment of the preload allows the load-carrying capability and spring characteristics of the shock absorber to be changed to suit the weight and the preference of the rider.

Unlike conventional spring systems, the preload adjustment, in the preferred embodiment, by means of the preload shaft 80 is accomplished without reducing the maximum travel capacity for the shock absorber. Moreover, since the spring rate of the elastomeric spring element 84 increases as it is compressed, increasing the preload also increases the spring rate. Thus, a lightweight rider who selects a light preload is provided with a lower spring rate than a heavy rider who applies a higher preload. Advantageously, a single spring element provides progressive rate adjustability, thereby eliminating the need to change elastomers for different riders and/or riding conditions.

The elastomeric spring element 84 operates primarily as a spring. According to the present invention, additional damping that is adjustable "on the fly" is incorporated into the telescoping motion. In a preferred embodiment, such damping is provided by a hydraulic damping unit 70. The damping unit 70 is received within the upper portion of the shock absorber above the elastomeric spring 84 and is provided by a piston/cylinder, the cylinder forming a hydraulic chamber 71 that is annular and is defined internally by the through-tube 60, which is a moving wall for the annular chamber, and externally by a cylinder member 72. External threads 74a and a flange portion 74b of the cylinder member 72 provide a threaded and abutting connection of the cylinder member to the upper end of the inner tube 90, which is internally threaded.

A piston member 76 of the damping unit 70 has an annular piston body 76a that is received within the annular chamber and a tubular piston shaft 76b that extends upwardly to the top of the shock absorber and is affixed by a threaded connection to the threads 54 of the cap 50. The upper portion of the through-tube 60 is of a lesser outer diameter than the lower portion, and the bottom of the piston body 76a engages a shoulder 60a on the upper end of the larger diameter lower portion of the through-tube. The preload of the elastomeric spring 84 pushes up on the through-tube and maintains engagement between the shoulder 60a and the piston body 76a, and downward movement of the piston 76 with the outer tube 40 is transmitted to the through-tube at the shoulder 60a, thus connecting the through-tube to the cap 50. Thus, the piston member 76 and the through-tube are movable together axially up and down within the chamber 71 as the outer tube 40 moves up and down relative to the inner tube 90. The piston member 76 is shown in its uppermost position in the drawings.

A lower end cap 77 is suitably affixed, such as by a rolled joint, to the lower end of the cylinder member 72 and is sealed to the through-tube 60 by a seal 77a. Similarly, an upper end cap 78 is affixed to the upper end of the cylinder member and sealed to the piston rod 76b by a seal 78a. The outer diameters of the larger lower portion of the through-tube 60 and of the piston rod 76b are equal. Accordingly, the volume of the annular chamber of the damping unit remains constant throughout the range of motion of the piston member within the annular chamber. The chamber 71 is filled with a suitable hydraulic liquid such as oil, and the piston has associated with it a controllable bypass that can be adjusted to change the rate of flow of the hydraulic liquid between the sections of the chamber on opposite sides of the piston body 76a, one of which may be complete so that the shock absorber is completely locked out. When liquid flows through the bypass, the motion of the outer tube 40 of the shock absorber relative to the inner tube 90 is damped. When no liquid flows through the bypass, the outer tube cannot move relative to the inner tube.

In the embodiment of FIGS. 1 to 4, the controllable bypass includes a damper control disc 100 that is received on the through-tube 60 immediately below the piston body 76a. The through-tube has flats 60b that couple the disc 100 to the through-tube for rotation and also provide shoulders at the lower face of the disc that affix the disc to the through-tube axially. The control disc 100 has a hole 101 that in one position of the disc relative to the piston body 76 registers with a hole 76c in the piston body 76a. A detent 103 is engaged between the disc 100 of the piston body and enables the position of the disc rotationally relative to the piston body to be held in either of two fixed positions. The detent 103 consists of a pin 103a on the disc 100 that extends into an elongated groove 103b in the piston 76. The piston 76 is made of a moderately compressible material, and when the disc is rotated by a control knob or lever 104 at the top of the through tube 60, the wall of the groove in the piston deforms to enable the pin to move along the groove. The resiliency of the piston maintains the pin 103b in one or the other end of the groove. In the position shown in FIG. 4, the detent 103 is maintaining the relative positions of the disc and piston such that the hole 101 in the disc is in register with the hole 76c in the piston, thereby allowing fluid to flow through the controllable bypass. When the pin 103a is at the other end of the groove 103b, the bypass is closed. In the closed position, the control rod cannot move, because hydraulic liquid is trapped in each of the sections of the chamber above and below the piston 76. In the closed position, therefore, the shock absorber is locked out.

Figure 5A:
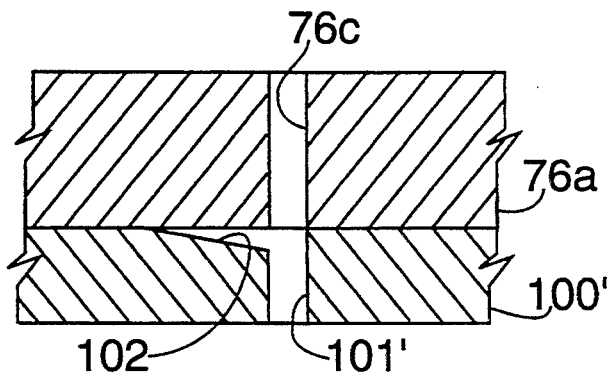
FIGS. 5A, 5B, and 5C are detail fragmentary side cross-sectional views of another form of controllable bypass of the hydraulic damper.
Figure 5B:
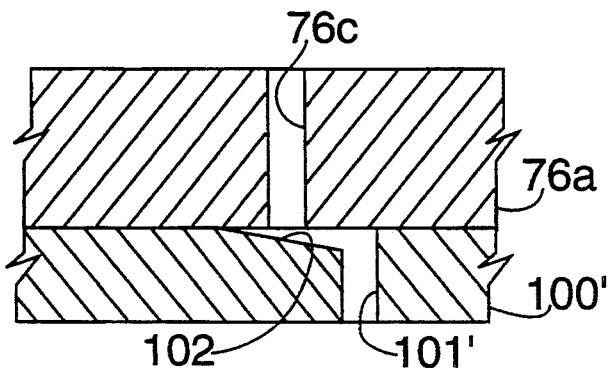
Figure 5C:
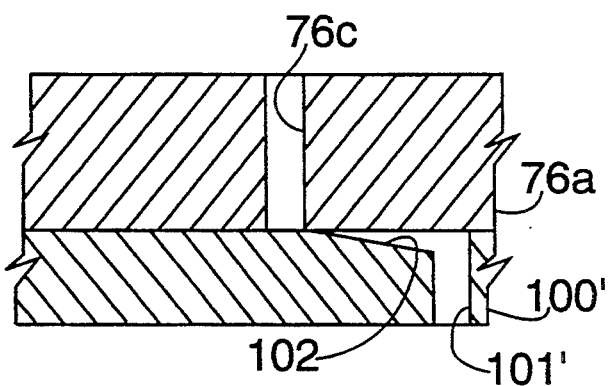

FIGS. 5A, 5B, and 5C show one form of controllable bypass which provides for variable damping rates established by holding the rotational position of the disc 101' at any of an infinite number of positions for continuously variable fluid flow rates through the bypass. In the position shown in FIG. 5A, the hole 76c through the piston body is fully open to the hole 101' in the disc 100', thus permitting hydraulic liquid to flow across the piston relatively easily. In the position shown in FIG. 5B, a shallow part of a groove 102 registers with the hole 76b, thus restricting the flow across the piston. In the position shown in FIG. 5C, the bypass is closed. The controllable bypass allows the rider to set the damping of the shock absorber to a selected point between a minimum restriction on oil flow (FIG. 5A), which provides a "soft" ride, and a complete restriction on oil flow (FIG. 5C), which locks out the shock absorber.

The bypass can take various other forms, such as a series of different size holes in either the piston body or the control disc, an elongated hole in one of the members that is oriented obliquely to the radial and progressively closes off a hole in the other member, and grooves in the faces of both members of variable depths or variable degrees of overlap.

The shock absorber also includes a top-out cushioning bumper 79 of elastomeric material positioned between the piston body 76a and the end cap 78 to provide a cushioning effect during top-out, cushioning the system during rebound after large impacts. The bumper is donut-shaped and may be made of any suitable elastomeric material.

The preferred material for the elastomeric spring element 84 is microcellular polyurethane foam of a relatively high density (0.65 gm/cc). Such a shock material is available from Freudenberg-NOK, Manchester, N.H., under the trade name AUZ 2500.

Though a preferred embodiment has been shown and described, alternate designs may be employed to accomplish the desired function. For example, a bottom-out bumper (such as a snubber) may be located between the fork crown 11 and the lower collar 45. Such a location permits a large diameter cushioning member to be used. Alternately, a bottom-out bumper may be positioned adjacent the lower end cap 77 of the damping unit.

While embodiments and alternatives of the present invention have been shown and described, various modifications may be made by those skilled in the art without departing from the scope of the present invention. All such modifications and equivalents are intended to be included within the scope of the invention as defined in the appended claims.

I claim:

1. A suspension assembly for a steerable wheel, comprising an elongated outer tube, an elongated inner tube having a portion adjacent its upper end telescopically and coaxially received within a portion adjacent the lower end of the outer tube for sliding movement axially of the outer tube in guided relation, a shock-absorbing mechanism received within and coupled between the inner and outer tubes and including a through-tube connected to the outer tube and received in an upper portion of the outer tube and having its lower end extending into an upper portion of the inner tube, a preload piston adjacent the lower end of the through-tube and joined to the through-tube, and at least one compression spring disposed in the inner tube and engaged under compression between the inner tube and the preload piston; and hydraulic damper means coupled between the inner and outer tubes and including a cylinder member connected to the inner tube and defining with the through-tube an annular chamber containing a hydraulic liquid, a piston connected to the outer tube, the piston including an annular piston body received within the cylinder member and a tubular piston rod that extends upwardly out of the cylinder member, is joined to the outer tube and telescopically receives a portion of the through-tube, the outer diameter of the piston rod and the outer diameter of the portion of the through-tube below the piston body and within the cylinder member being equal, restricted bypass means across the piston for permitting the liquid to flow between portions of the chamber on opposite sides of the piston, and control means operable from outside of the tubes for controlling the flow of liquid through the bypass means.

2. A suspension assembly according to claim 1 wherein the through-tube is rotatable relative to the piston rod, control means includes a control member affixed to the through-tube adjacent the piston body, and the bypass includes passages through the control member and piston body sized and configured to control liquid flow through the bypass in at least two different rotational positions of the control member.

3. A suspension assembly according to claim 2 wherein the control means is operable to substantially stop the flow of liquid through the bypass in one rotational position of the through-tube.

4. A suspension assembly according to claim 3 wherein the control means further includes detent means acting between the control member and the piston body for releasably retaining each rotational position of the through-tube.

5. A suspension assembly according to claim 1 wherein the preload piston is movable axially relative to the through-tube and further comprising means accessible from outside the tubes for adjusting the axial position of the preload piston relative to the through-tube.

6. A suspension assembly according to claim 5 wherein the preload piston is affixed to a preload shaft that is received telescopically within the through-tube and wherein the means for adjusting the axial position of the preload piston is an adjustment screw threaded into an internally threaded portion at the upper end of the through-tube.

7. A suspension assembly for a steerable wheel, comprising an elongated outer tube, an elongated inner tube having a portion adjacent its upper end telescopically and coaxially received within a portion adjacent the lower end of the outer tube for sliding movement axially of the outer tube in guided relation, a shock-absorbing mechanism received within and coupled between the inner and outer tubes and including an upper cap connected to the outer tube above the upper end of the inner tube, a through-tube coupled to the outer tube axially and rotatable relative to the outer tube, concentrically positioned in an upper portion of the outer tube, and having its lower end extending into an upper portion of the inner tube, a preload shaft received in the through-tube and having at its lower end a preload piston located below the lower end of the through-tube, means for adjusting the axial position of the preload shaft relative to the through-tube, and at least one compression spring disposed in the inner tube and engaged under a preload between the inner tube and the preload piston; and a hydraulic damper unit connected between the inner tube and the outer tube and including a cylinder member received coaxially within an upper portion of the inner tube, affixed to the inner tube and surrounding a portion of the through-tube, a piston member having an annular piston body received within the cylinder member and a tubular piston rod extending upwardly and joined at its upper end to the upper cap and telescopically receiving a portion of the through-tube, the outer diameter of the piston rod and the outer diameter of the portion of the through-tube below the piston body and within the cylinder member being equal, upper and lower end caps affixed to the upper and lower ends of the cylinder member and sealed in sliding relation to the piston rod and the through-tube, respectively, the cylinder member, end caps and portions of the piston rod and through-tube defining an annular closed chamber, a hydraulic liquid contained in the chamber, and bypass means for permitting restricted flow of the hydraulic liquid between portions of the chamber on opposite sides of the piston upon movement of the piston through the chamber in response to axial acceleration of the outer tube relative to the inner tube.

8. A suspension assembly according to claim 7 wherein the hydraulic damper means further includes means for controlling the flow of liquid through the bypass means.

9. A suspension assembly according to claim 7 wherein the hydraulic damper means further includes control means operable from outside of the tubes for controlling the flow of liquid through the bypass means.

10. A suspension assembly according to claim 9 wherein the control means includes a control member affixed to the through-tube adjacent the piston body and the bypass means includes passages through the control member and piston body sized and configured to control the flow through the bypass means in different rotational positions of the through-tube.

11. A suspension assembly according to claim 10 wherein the control means is operable to substantially stop the flow of liquid through the bypass in one rotational position of the through-tube.

12. A suspension assembly according to claim 11 wherein the control means further includes detent means acting between the control member and the piston body for releasably retaining each rotational position of the through-tube.

* * * * *